(12) United States Patent
Cai et al.

(10) Patent No.: US 10,810,268 B2
(45) Date of Patent: Oct. 20, 2020

(54) HIGH-THROUGHPUT DISTRIBUTED TRANSACTION MANAGEMENT FOR GLOBALLY CONSISTENT SHARDED OLTP SYSTEM AND METHOD OF IMPLEMENTING

(71) Applicant: Futurewei Technologies, Inc., Plano, TX (US)

(72) Inventors: Le Cai, Cupertino, CA (US); Jianjun Chen, Cupertino, CA (US); Mason Sharp, Holmdel, NJ (US); Yu Chen, San Jose, CA (US); Jun Chen, Cupertino, CA (US); Jason Yang Sun, Palo Alto, CA (US); Yongyan Wang, Sunnyvale, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 319 days.

(21) Appl. No.: 15/833,658

(22) Filed: Dec. 6, 2017

(65) Prior Publication Data
US 2019/0171763 A1   Jun. 6, 2019

(51) Int. Cl.
*G06F 16/951* (2019.01)
*G06F 11/14* (2006.01)

(52) U.S. Cl.
CPC ........ *G06F 16/951* (2019.01); *G06F 11/1448* (2013.01); *G06F 11/1464* (2013.01)

(58) Field of Classification Search
CPC . G06F 16/951; G06F 11/1464; G06F 11/1448
USPC ........................................................ 707/607
See application file for complete search history.

(56) References Cited

U.S. PATENT DOCUMENTS

| | | | | |
|---|---|---|---|---|
| 9,792,320 | B2* | 10/2017 | Bercovici | ............. G06F 16/273 |
| 2009/0217274 | A1* | 8/2009 | Corbin | .................... G06F 9/466 |
| | | | | 718/101 |
| 2013/0124475 | A1* | 5/2013 | Hildenbrand | ....... G06F 16/2315 |
| | | | | 707/636 |

(Continued)

FOREIGN PATENT DOCUMENTS

| | | |
|---|---|---|
| CN | 106802932 A | 6/2017 |
| EP | 2972744 A1 | 1/2016 |

(Continued)

OTHER PUBLICATIONS

Chen, Jianjun, et al., "Data Management at Huawei: Recent Accomplishments and Future Challenges", ICDE 2019, Macao, China, Apr. 8-11, 2019, pp. 13-24.*

(Continued)

*Primary Examiner* — Robert Stevens
(74) *Attorney, Agent, or Firm* — Vierra Magen Marcus LLP

(57) ABSTRACT

A system and method for improved online transaction processing (OLTP) in a sharded database is provided. Overhead associated with a global transaction manager is reduced and scalability improved by determining whether incoming queries are single-shard transactions or multi-shard transactions. For multi-shard transactions, a distributed transaction ID (DXID) is requested from the GTM, and then forwarded with the query to one or more data notes. For single-shard transactions, the query is sent to a data node without requesting a DXID from the GTM.

21 Claims, 13 Drawing Sheets

(56) References Cited

U.S. PATENT DOCUMENTS

| | | | | |
|---|---|---|---|---|
| 2015/0120645 A1* | 4/2015 | Varakur | ............. | G06F 16/2379 |
| | | | | 707/607 |
| 2015/0293966 A1* | 10/2015 | Cai | ................... | G06F 11/1474 |
| | | | | 707/648 |
| 2016/0011988 A1 | 1/2016 | Shapiro et al. | | |
| 2016/0306854 A1* | 10/2016 | Hegde | ................... | G06F 16/22 |
| 2016/0335310 A1 | 11/2016 | Lahiri et al. | | |
| 2017/0103094 A1* | 4/2017 | Hu | ....................... | G06F 16/213 |

FOREIGN PATENT DOCUMENTS

| | | |
|---|---|---|
| EP | 3185142 A1 | 6/2017 |
| WO | 2017063520 A1 | 4/2017 |

OTHER PUBLICATIONS

International Search Report dated Feb. 20, 2019, in PCT Patent Application No. PCT/CN2018/118134, 10 pages.
Extended European Search Report dated Sep. 7, 2020 in European Patent Application No. 18886791.5 8 pages.

* cited by examiner

| CN Session S1 | CN Session S2 | GTM | DN1 | DN2 |
|---|---|---|---|---|
| BEGIN; | | | | |
| MS_txn1: UPDATE table t0, row r1, r2, r5 | | | | |
| | | Generate DXID 1001, snapshot {MS_txn1} | | |
| | | | Convert to local txid 1201, merge snapshot with local {MS_txn1} | Convert to local txid 1301, merge snapshot with local {MS_txn1} |
| | | | In Prepared status, r1, r2 already updated to r1', r2' | In Prepared status, r5 aleady updated to r5' |
| Commit MS_txn1; | | | | |
| | | MS_txn1 Committed | | |
| | | | | MS_txn1 in Committed status |
| | SS_txn: read r1, r2, based on read value, update r3 (in DN1) | | | |

FIG. 4A

| CN Session S1 | CN Session S2 | GTM | DN1 | DN2 |
|---|---|---|---|---|
| | | | Convert to txid 1203, merge local snapshot {SS_txn, MS_txn1} with dist snapshot {MS_txn2}, since GTM has global view of distributed transactions, we get merged snapshot {SS_txn, MS_txn2}. But found MS_txn1 still in Prepared state, so PAUSE to wait for its commit | Read data, based on snapshot {MS_txn2} |
| | | | MS_txn1 in Commited state | |
| | | | MS_txn2 can resume, but waits on lock for r3 | |
| | Commit SS_txn; | | SS_txn in Committed state; release lock on r3; | | time →

FIG. 4C

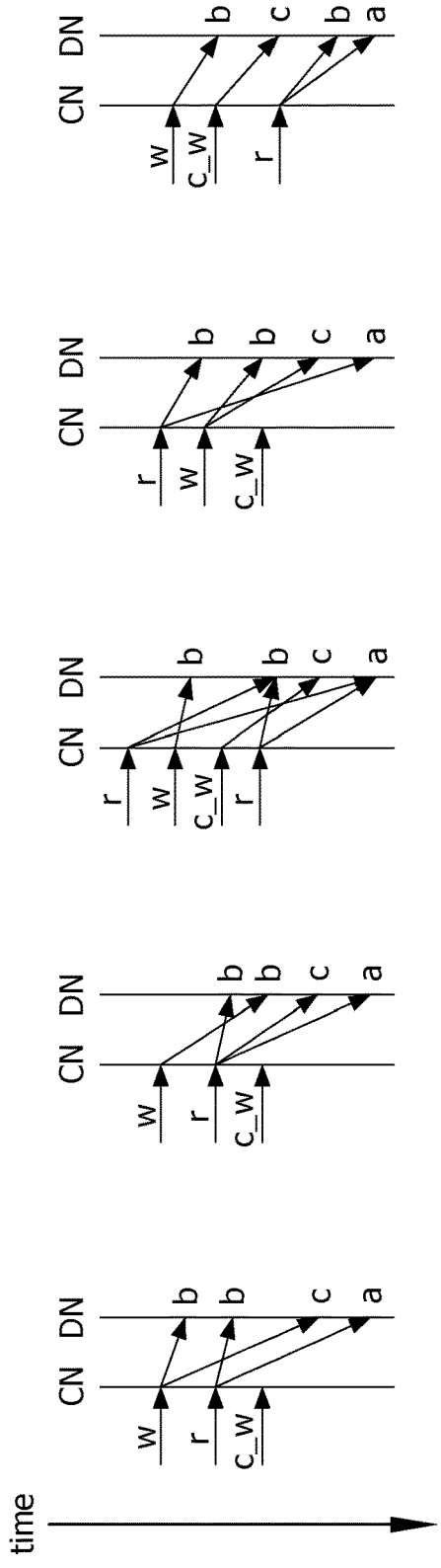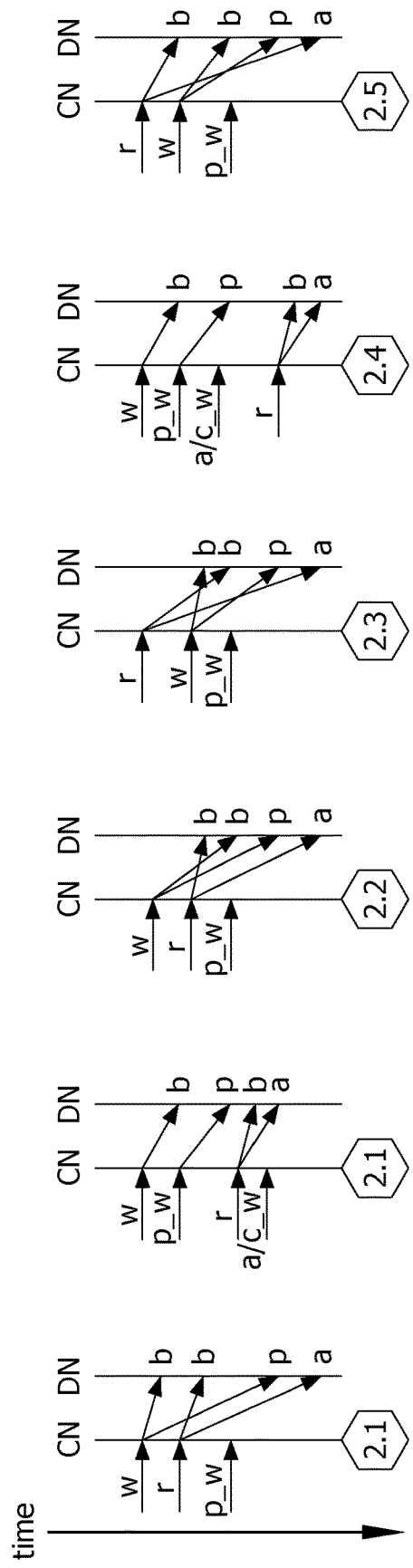

HIGH-THROUGHPUT DISTRIBUTED TRANSACTION MANAGEMENT FOR GLOBALLY CONSISTENT SHARDED OLTP SYSTEM AND METHOD OF IMPLEMENTING

BACKGROUND OF THE INVENTION

Distributed online transaction processing (OLTP) systems often utilize a sharded database to achieve scalable performance. Sharded databases divide data into shards or partitions based on a hash value or a range of a distribution column. The data shards are distributed to database nodes (servers) and each node manages their data independently. The overall throughput is boosted when adding servers and nodes, because data are re-distributed so that each database shard or node contains less data and can handle more concurrent queries. Such a share-nothing sharding system can achieve ideal performance if applications only access data in an individual server. However, if transactions involve multiple nodes, networking and synchronization introduce overhead and degrade scalable performance.

The synchronization of distribution transactions in a sharded OLTP system is often achieved by using two-phase commit (2PC) and a centralized global transaction manager (GTM), where the former offers consistent write operation across nodes and the latter supports a global consistent view or snapshot. FIG. 1 illustrates a sharded OLTP system, such as, for example, Postgres-XC (PG-XC). In general, Applications interact with a sharded OLTP system 100 by sending queries or statements 102 to its coordinators. The coordinators are comprised of a plurality of coordinator nodes (CN) 104a, 104b, 104c, 104d. CN's interpret those statements and determine which database shard or data node (DN) 106a-106e contains the queried data. Those statements are sent to specific DNs for query processing, including actual access to stored data. A global transaction manager (GTM) 108 generates and maintains an ascending GXID (global transaction ID) for transactions with write operations as well as a list of such transactions which are still active. This list is called a global snapshot used to support multi-valued concurrency control (MVCC), a fundamental mechanism to achieve high concurrency allowing readers without blocking writers and writers without blocking readers. In MVCC, when a database record is updated, it is not replaced by updates. Instead, a new version of the record is created. Both old and new versions coexist in the system so that readers and writers of the same record do not block each other. They can access the correct version based on the snapshot taken when a transaction or a statement starts, and the transaction IDs stored in the header of the record representing transactions doing an update. When those updating transactions (including insert, update, and delete) commit before the snapshot is taken, their versions are visible.

SUMMARY OF THE INVENTION

The above described disadvantages are overcome and other advantages are realized according to exemplary embodiments of the disclosure, which describe a system for processing database transactions. The system comprises a coordinator node (CN) that receives a transaction query. The CN determines if the transaction is a single shard transaction or a multi-shard transaction. When the transaction is determined by the CN to be a multi-shard transaction, the CN requests a distributed transaction ID (DXID) for the transaction from a global transaction manager (GTM), receives the DXID for the transaction, and sends the query and the DXID to two or more data nodes associated with the transaction. When however, the transaction is determined to be a single shard transaction, the CN sends the query to a single data node associated with the transaction without first requesting a DXID from the GTM.

Embodiments described in the disclosure may also be implemented as a computer implemented method for processing database transactions. The method comprises the steps of receiving, at a coordinator node having one or more processors for executing instructions, a transaction query, and determining if the transaction is a single shard transaction or a multi-shard transaction. When the transaction is determined to be a multi-shard transaction, the method proceeds by requesting a distributed transaction ID (DXID) for the transaction from a global transaction manager (GTM) having one or more processors for executing instructions, receiving the DXID for the transaction from the GTM at the coordinator node, and sending the query and the DXID to two or more data nodes associated with the transaction. When, however, the transaction is determined to be a single shard transaction, the method proceeds by sending the query to a single data node associated with the transaction without first requesting a DXID from the GTM.

Embodiments described in the disclosure may further be implemented as a non-transitory computer-readable media storing computer instructions, that when executed by one or more processors, cause the one or more processors to perform a series of steps. The steps include receiving a transaction query at a coordinator node, and determining if the transaction is a single shard transaction or a multi-shard transaction. When the transaction is determined to be a multi-shard transaction, the steps provide for requesting a distributed transaction ID (DXID) for the transaction from a global transaction manager (GTM), receiving the DXID for the transaction, and sending the query and the DXID to two or more data nodes associated with the transaction. When, however, the transaction is determined to be a single shard transaction, the steps provide for sending the query to a single data node associated with the transaction without first requesting a DXID from the GTM.

BRIEF DESCRIPTION OF THE DRAWING FIGURES

Exemplary embodiments of the disclosure shall be described in connection with the appended drawings, in which:

FIGS. 4A-4D are timing diagrams describing the process of several transactions according to an exemplary embodiment;

FIGS. 8A-8E illustrate a process for checking visibility of single shard and multi-shard transactions according to an exemplary embodiment;

FIGS. 8F-8K further illustrate the process for checking visibility of FIGS. 8A-8E.

Figure 9:
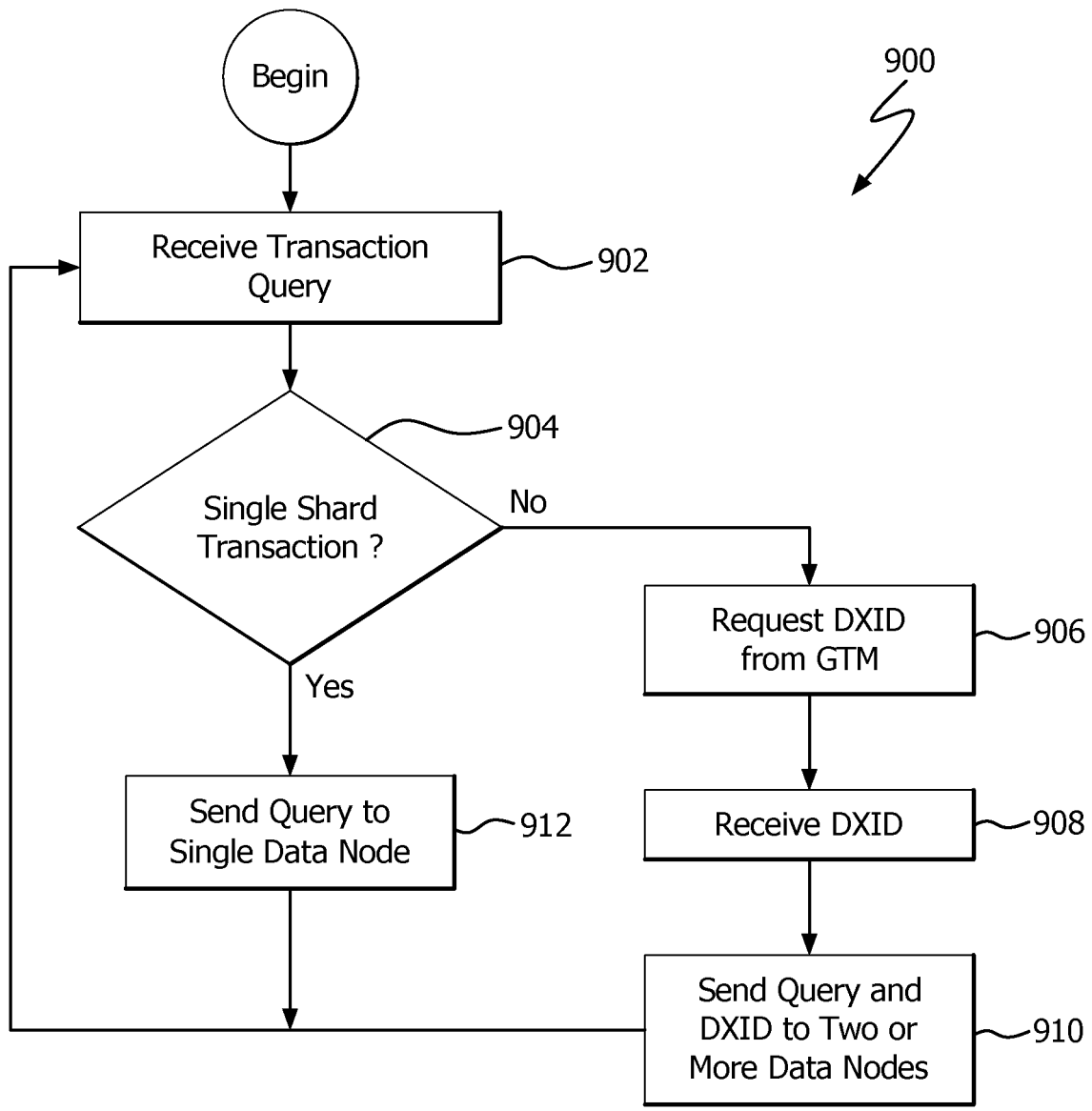
Figure 10:
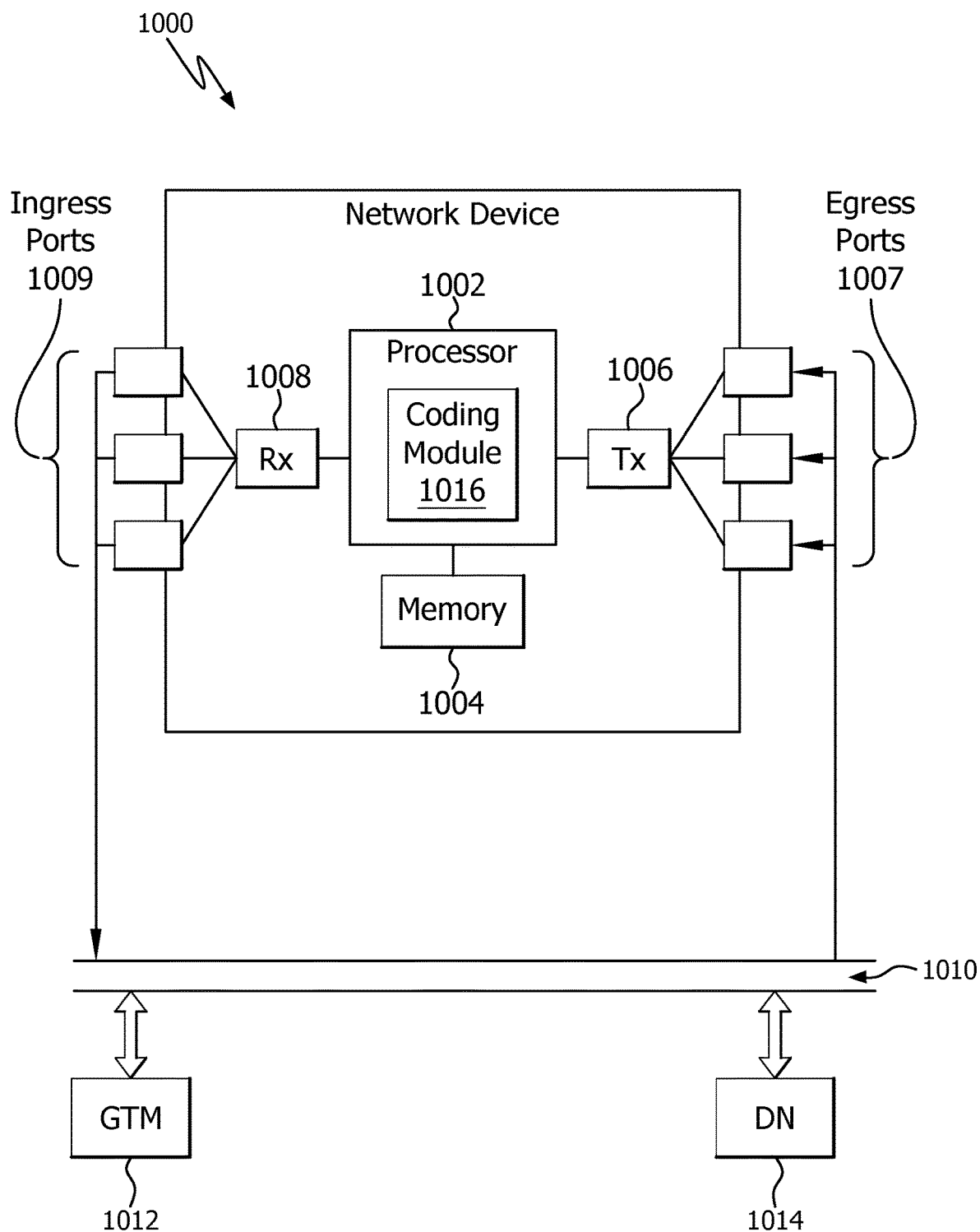
Figure 11:
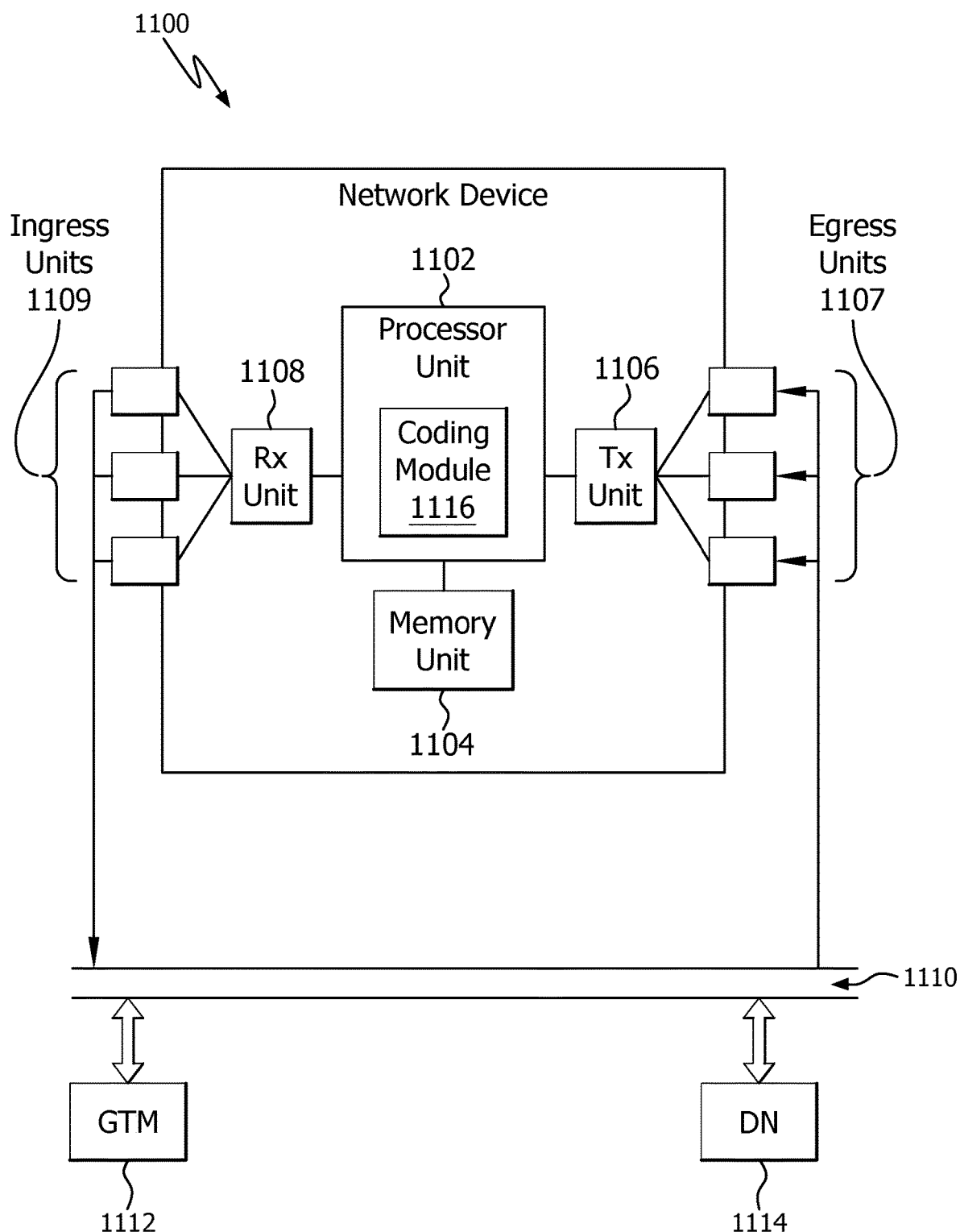

FIG. 9 is a flow chart of a process according to an exemplary embodiment of the invention;

FIG. 10 is a block diagram of a device that can serve as a coordinator node (CN) according to an exemplary embodiment of the invention; and FIG. 11 is a block diagram of another device that can serve as a coordinator node (CN) according to an exemplary embodiment of the invention.

Throughout the drawings, like reference numbers should be understood to refer to like elements, features and structures.

DETAILED DESCRIPTION OF EXEMPLARY EMBODIMENTS

The synchronization cost of using GTM in a sharded OLTP system is high given each transaction needs to communicate with the GTM multiple times during execution. Many of those communication and interactions, such as acquiring GXID and enqueue/dequeue itself from GTM's active transaction list, are serialized and can limit overall throughput. As a result, the GTM often becomes the bottleneck when more database shards exist in the system. A few industry practices, have attempted to mitigate this issue.

VoltDB divides database data into partitions. Each partition maintains a command queue to execute the end-user's commands, including execution plans for ad hoc SQL statements, execution plans for distributed SQL fragments, and stored procedure invocations. In an individual partition, commands run one at a time without overlap, providing serializable isolation. Queries accessing data in multiple partitions are processed using multi-partition transactions. Those transactions' commands are distributed to partitions, inserted into their command queue, and executed with single-partition commands. The commands from a multi-partition transaction need to complete atomically, that is, all of the sub-tasks in partitions of a multi-partition transaction need to all complete or fail, so a partition stalls when it completes a command from a multi-partition transaction but the transaction is not committed, that is, all distributed commands are not yet completed. For VoltDB, a disadvantage is that all jobs in each queue (each partition) are executed in order. When encountering jobs from a multi-partition transaction, the execution of multiple queues need to sync, and thus stall, until all of the jobs finish, before other transactions' jobs may be executed.

Spanner enables globally-consistent read and externally consistent writes across a database, which may be distributed to multiple data centers. In Spanner, a Truetime approach is used to maintain a global synchronous timestamp and expose clock uncertainty between wall times of individual servers. However, this approach is a hardware and software combined solution and adopts multiple modern clock references, such as GPS and atomic clocks. 2PL (2-phase locking) was used to serialize global data access while data writes on a single shard are serialized by the Paxos replication protocol.

Another proposal is to modify Postgres-XL to eliminate the GTM dependency. All single-shard transactions may use the existing local transaction handling facilities. Multi-shard write transactions are identified and generate a distributed transaction ID for such transactions only. This approach reduces communication and management overhead which contributes to enhanced overall system performance for workloads where multi-node operations are infrequent.

Embodiments of the disclosure, which are referred to herein as GTM-lite based distributed transaction management, advantageously improve the throughput and scalability of sharded OLTP. This is preferably accomplished by avoiding centralized concurrency management overhead for single-shard transactions; and only pausing distributed transaction at data conflict when the GTM and DNs have out-of-sync snapshots. Using this strategy, the majority of the OLTP workload, which are single-shard queries, are resolved more quickly, and a sharded OLTP system can scale out without the GTM being a bottleneck. As will be described in further detail below, this approach also offers a flexible way to trade off performance and isolation level: using a distributed transaction if needing snapshot isolation, and using a single-shard transaction if read committed is enough.

In exemplary embodiments of the disclosure the performance of single-shard transactions are optimized and consistent access of multi-shard transactions is maintained, as will be described in further detail below. Single-shard transactions are advantageously kept GTM-free and a GTM is only responsible for multi-shard transaction consistency. In other words, the workload for the GTM will be largely reduced to distributed transaction only, so that the GTM is not the system's bottleneck. The majority of local transactions do not need many-round communications with the GTM, which significantly increases throughput.

Figure 1:
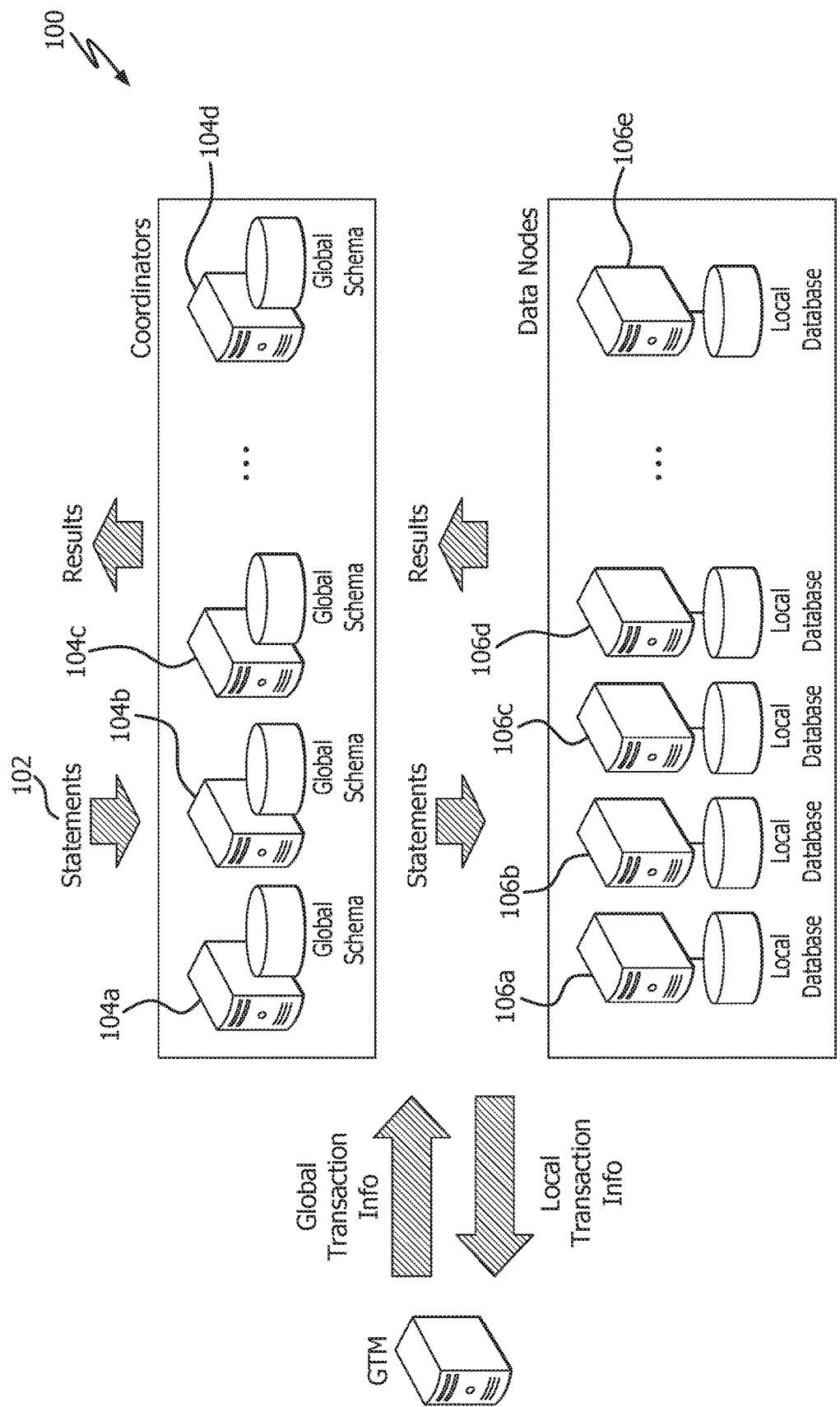
FIG. 1 illustrates a sharded OLTP system.
Figure 2A:
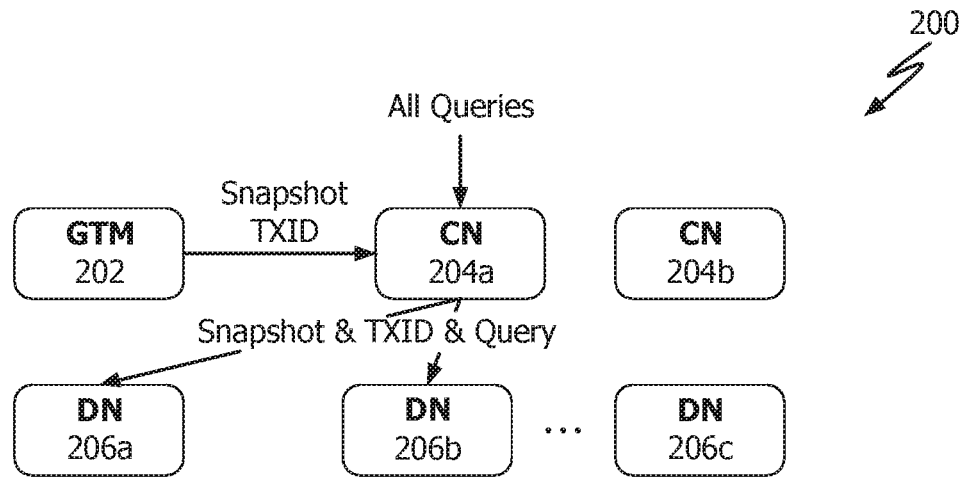
FIG. 2A illustrates system including a global transaction manager.

FIG. 2A illustrates a conventional system 200. The system 200 includes a GTM 202, a set of coordinator nodes (CNs) 204a, 204b, and a set of data nodes 206a-206c. In such a conventional system all queries are received at a CN 204a, and for each query received the CN requests a TXID and global snapshot from the GTM 202. The CN 204a then send the global snapshot, TXID and query to one or more of the data nodes DNs 206a-206c. Accordingly, in the conventional system, there is traffic to and from the GTM for each query.

Figure 2B:
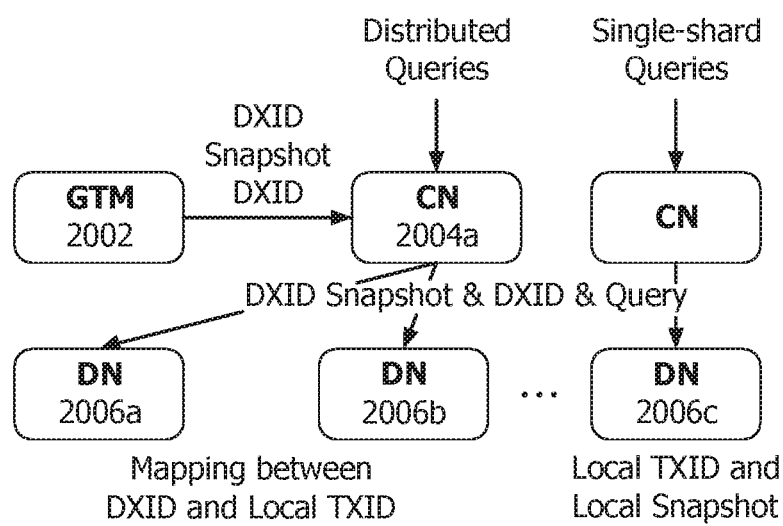
FIG. 2B illustrates a system according to an exemplary embodiment.

FIG. 2B illustrates a system according to an exemplary embodiment of the present disclosure. As illustrated, distributed queries, that is, queries that implicate two or more data nodes DNs are received at a CN 2004a. The CN 2004a recognizes that the query is a distributed query, and as a result requests a DXID and DXID snapshot from the GTM 2002. The CN 2004a then sends the DXID, DXID snapshot and the query to the two or more implicated data nodes DNs 2006a-2006b. The data nodes 2006a-2006b receiving the DXID each map the DXID snapshot to the local TXID snapshot. On the other hand, single-shard queries received at a CN 2004b cause the CN 2004b to send the query to the implicated single data node DN 2006c without the requirement of making any requests to the GTM 2002. The data node DN 2006c receives the query and generates a TXID and local snapshot.

Figure 3:
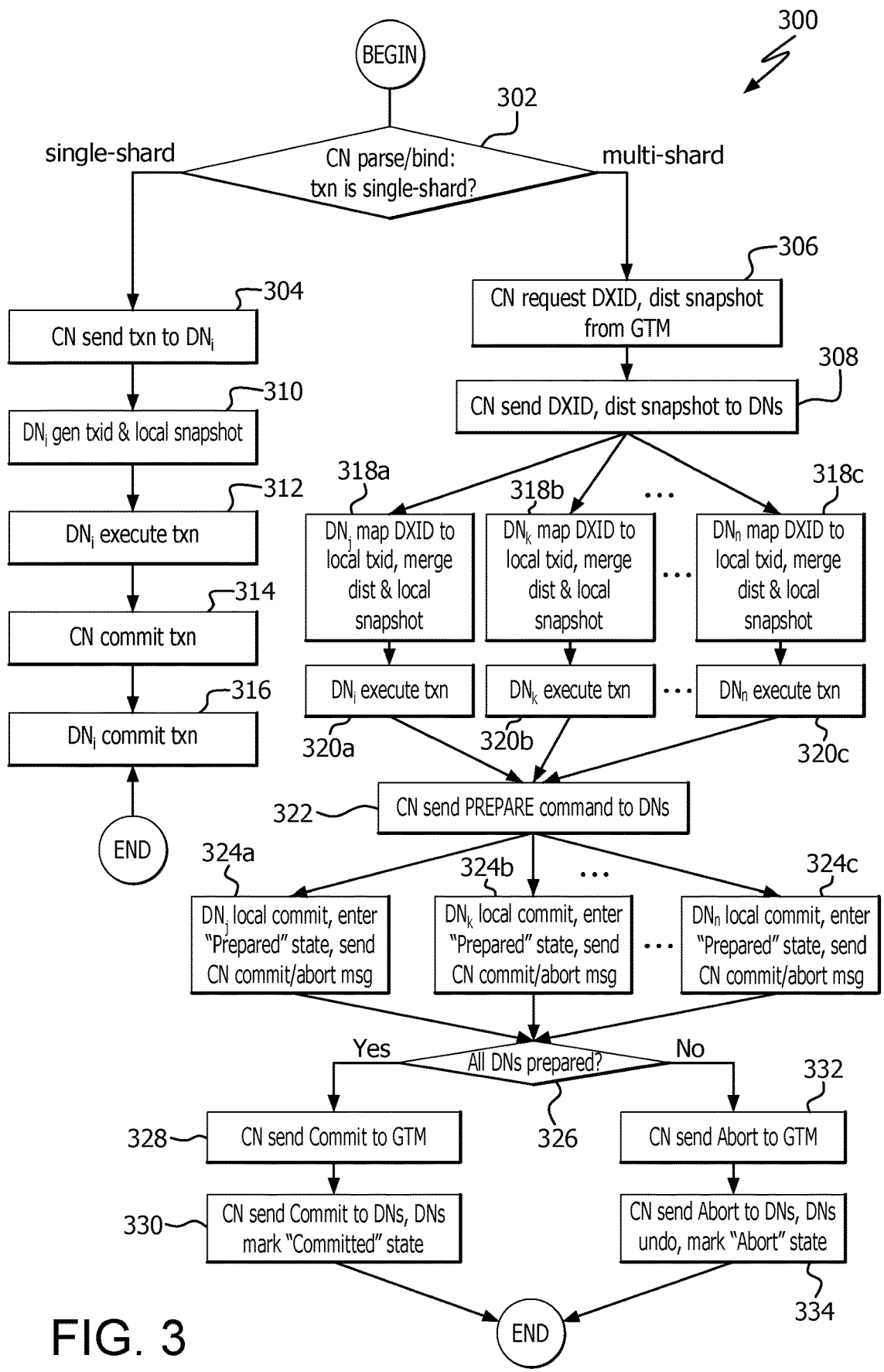
FIG. 3 is a flowchart illustrated a process according to an exemplary embodiment.

The overall work flow 300 of a GTM-lite system according to an exemplary embodiment of the disclosure will now be described in connection with the flow chart of FIG. 3. At step 302 a transaction is received at a CN. The CN determines if the transaction is a single-shard transaction. If the transaction is a single-shard transaction, then the CN sends the transaction to a data node at step 304. Only if the transaction is a multi-shard transaction, the CN requests a distributed transaction ID (DXID) and a distributed snapshot from the GTM at step 306. The CN then sends the DXID and distributed snapshot to the implicated data nodes at step 308.

The remainder of the single-shard transaction work flow will now be described. After the CN sends the single-shard transaction to the designated data node at step 304, the target data node $DN_i$ generates a transaction ID (TXID) and a local snapshot at step 310. At step 312, the data node $DN_i$ executes the transaction. At step 314 the CN commits the transaction, and at step 316 the data node $DN_i$ commits the transaction. Notably absent from the single-shard transaction are interactions with the GTM, freeing the GTM to concurrently handle other tasks.

The remainder of the milti-shard transaction work flow will now be described. Ater the CN sends the DXID, and the distributed snapshot to the multiple target DNs at step 308, each of the target data nodes $DN_j$, $DN_k$ through $DN_n$ maps the DXID to a local TXID, and merges the distributed and local snapshots at steps 318a-318c. At steps 320a-320c, each of the target data nodes $DN_j$-$DN_n$ execute the respective transactions. At step 322, the CN sends a PREPARE command to the target data nodes $DN_j$-$DN_n$. At steps 324a-324c, the target data nodes $DN_j$-$DN_n$ perform a local commit, enter the "prepared" state, and send a commit or abort message to the CN. At step 326, the work flow determines if all of the target data nodes $DN_j$-$DN_n$ are prepared. If they are, then the work flow continues at step 328, and the CN sends a commit to the GTM. At step 330, the CN sends a commit to the data nodes $DN_j$-$DN_n$, and the data nodes $DN_j$-$DN_n$ are marked in a "committed" state. If at step 326, it is determined that the data nodes $DN_j$-$DN_n$ are not al prepared, then the work flow continues at step 332, and the CN sends an abort command to the GTM. At step 334 the CN sends an abort to the data nodes $DN_j$-$DN_n$, the data nodes undo the previous transaction as invalid, and enter the "abort" state.

For read committed isolation level, at the beginning of a single-shard transaction, only the local snapshot is acquired; while multi-shard transactions acquire both a global snapshot from the GTM and local snapshots at all involved DNs. To provide snapshot isolation level, single-shard transaction still acquire a local snapshot, but at the beginning of multi-shard transactions, a global snapshot is acquired from GTM, and local snapshots on all involved DNs. In addition, local snapshots may preferably be reserved on the rest of the data nodes.

Figure 4B:
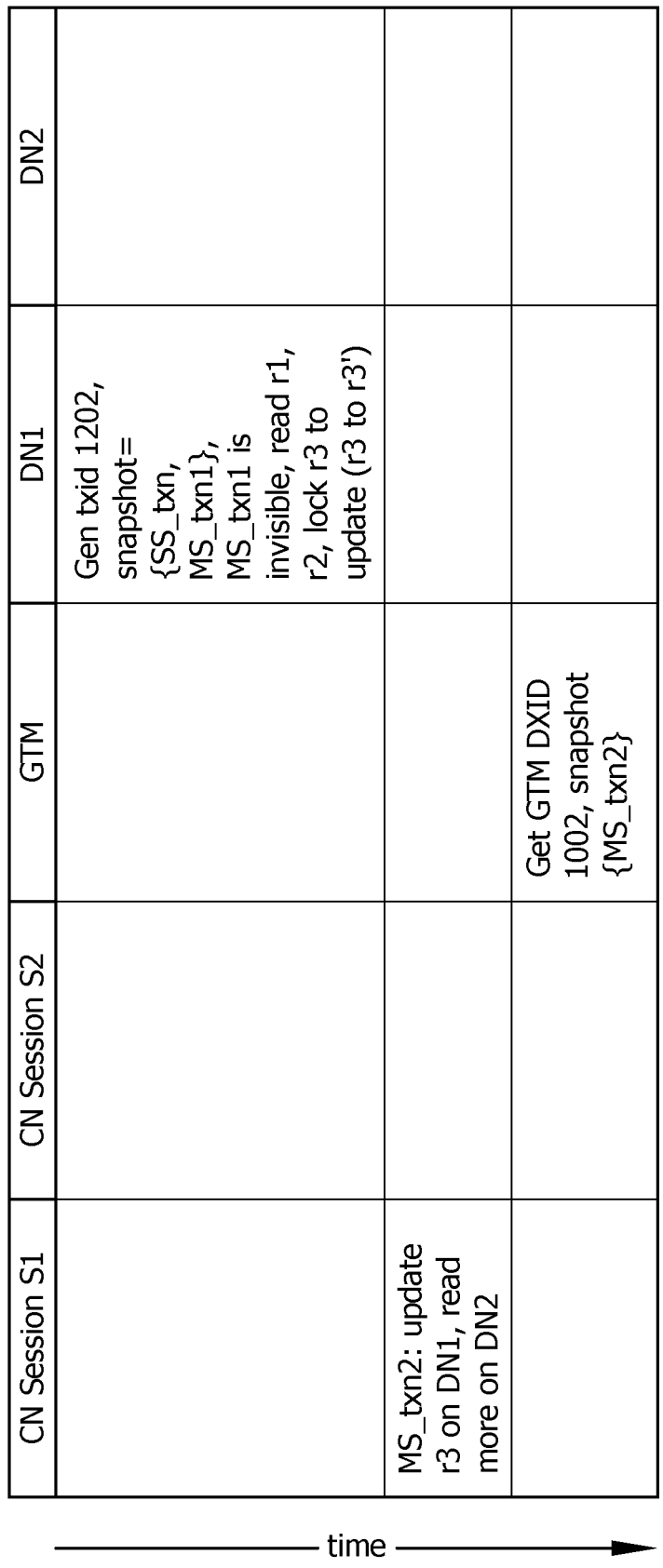
Figure 4D:
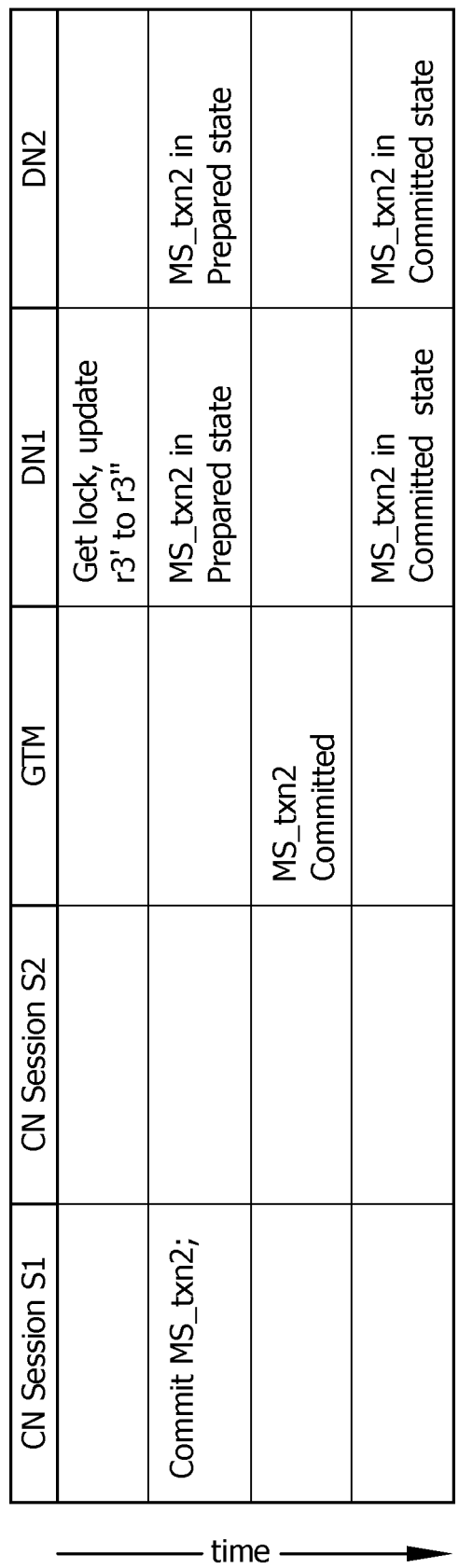

For example, three different transactions accepted by a CN will now be described in connection with the table illustrated in FIG. 4. CN Session S1 first begins a multi-shard transaction MS_txn1 with updates to r1, r2 and r5 in database table tO. CN finds out MS_txn1 involves data nodes DN1 and DN2, so it requests a DXID from the GTM. The GTM generates DXID 1001 and distributed snapshot {MS_txn1}. DN1 converts the DXID to local txid 1201, and merges the snapshot with local snapshot to {MS_txn1}. After DN1 and DN2 have done their job, CN will start a two-phase commit and send a PREPARE command to the DNs. When DN1 and DN2 finish their local commit, they both enter the "Prepared" state (which is marked "Prepared" in clog) before sending their response back to CN. With both data nodes responded COMMIT, CN will first send a commit message to the GTM to remove MS_txn1 from the active distributed transaction list, then sends commit confirm messages to both DNs.

However, the commit message reached DN2 before DN1, so at one moment, DN1 is still in the "Prepared" state for MS_txn1, while DN2 has already marked it "Committed". Just then, session S2 begins a new transaction SS_txn, reading data r1 and r2 and writing r3 on DN1. Since it is a single-shard transaction, DN1 generates a local txid 1202 and local snapshot {MS_txn1, SS_txn}. The update to r1 and r2 by MS_txn1 is invisible. So the SS_txn reads the older version of r1 and r2 and holds the lock to update r3.

Just before the SS_txn commits on DN1, CN session S1 received another distributed transaction MS_txn2, which intends to write r3 again and read some data on DN2. Similarly, it requests a DXID and distributed snapshot {MS_txn2} from the GTM and receives DXID 1002. However, in DN1 the local snapshot is {MS_txn1, SS_txn}, when merging with distributed snapshot, there is a conflict on MS_txn1: The GTM views it already committed, but DN1 has not yet received the final commit message so DN1 is still in the Prepared state. In this case, MS_txn2 will take the merged snapshot as {SS_txn, MS_txn2}, but will PAUSE to wait for MS_txn1 to complete its commit.

Finally, DN1 receives the commit message for MS_txn1, and changes from the Prepared state to the Committed state. Therefore, MS_txn2 can resume and start working with data after MS_txn1's change. But when MS_txn2 attempts to write r3, the r3 is still locked by SS_txn which has not committed. Until SS_txn completes its commit and releases the lock. MS_txn2 is now unblocked and can finish executing the transaction. Eventually, MS_txn2 goes through the two-phase commit, and commits at the GTM and all local data nodes.

In the above example, there are a several algorithms that will now be described in further detail. One algorithm is the visibility check for a distributed transaction with both local snapshot and distributed snapshot carried from the GTM. The following exemplary code illustrates the algorithm for determining visibility for a distributed transaction.

--- bool VisibilityCheck(Snapshot* localSnapshot, Snapshot* distSnapshot) {
If data is from multi-shard transaction(MS-Tx), which is committed at access time:
    1.1 invisible, if writer MS-Tx's TXID is in local snapshot and its DXID in global snapshot
    1.2 Invisible, if writer MS-Tx's DXID is in global snapshot but its TXID not in local snapshot (reader arrives at DN before writer)
    1.3 Invisible, if writer MS-Tx's DXID is not in global snapshot but its TXID in local snapshot: reader arrives at DN after writer, but reader start at GTM earlier than writer (reader's global snapshot max DXID < writer's DXID)
    1.4 visible, if writer MS-Tx's DXID is not in global snapshot but its TXID in local snapshot: reader arrives at DN after writer, but reader start at GTM after writer (write committed to GTM before reader starts)
    1.5 invisible, if writer MS-Tx is not in either global snapshot or local snapshot , and reader starts at GTM earlier than writer (reader's global snapshot max DXID < writer's DXID)
    1.6 visible, if writer MS-Tx is not in either global snapshot or local snapshot , and reader starts at GTM after than writer (reader's global snapshot min DXID > writer's DXID)
If data is from multi-shard transaction(MS-Tx), which is in prepare stage at access time:
    2.1 invisible, if writer MS-Tx is in both snapshots
    2.2 Invisible, if writer MS-Tx's DXID is in global snapshot but its TXID not in local snapshot
    2.3 Invisible, if writer MS-Tx's DXID is not in global snapshot but its TXID in local snapshot , and reader reaches GTM before writer's
    2.4 visible (commit) or invisible(abort), if writer MS-Tx's DXID is not in global snapshot but its TXID in local snapshot (writer commits or aborts at GTM but not at DN), and reader starts after writer's, need to wait till writer MS-Tx commits or abort in DN
    2.5 invisible, if writer MS-Tx is not in either global snapshot or local snapshot, and reader' start before writer
}

---

ANSI/ISO SQL Standards define isolation levels and the anomalies that may occur in each isolation level, as illustrated in the following table.

| ANSI Isolation Level | ANSI Anomalies | | |
| --- | --- | --- | --- |
| | Dirty reads | Non-Repeatable reads | Phantoms |
| Read Uncommitted | may occur | may occur | may occur |
| Read Committed | don't occur | may occur | may occur |
| Repeatable Read | don't occur | don't occur | may occur |
| Serializable | don't occur | don't occur | don't occur |

With regard to dirty reads, embodiments of the present disclosure apply visibility rules to ensure a transaction only sees committed data, thereby avoiding dirty reads.

With regard to non-repeatable reads, before accessing data on a participating DN, according to exemplary embodiments of the disclosure a transaction will first calculate a snapshot based on active transactions recorded by the GTM and the local DN. The snapshot remains unchanged throughout the lifetime of the transaction, and hence during the course of the transaction, it is not possible that if a row is retrieved multiple times, it shows different values.

With regard to phantoms, according to exemplary embodiments of the disclosure, a transaction's snapshot on each DN is taken prior to data access. DN snapshots together with the visibility rules capture a static constant state of the entire database, and thus for any range/predicate, the state also remains unchanged. Thus, any insert/update/delete satisfying the predicate but not captured by the snapshots and visibility rules will not become visible during the transaction execution.

Snapshot isolation has been used to criticize the ANSI SQL/ISO standard's definition of isolation levels, as it exhibits none of the anomalies that the SQL standard prohibited, yet is not serializable. The anomaly that snapshot isolation allows is called write skew. In write skew, two concurrent transactions read the same set of data, but modify disjointed sets of data. As an example, suppose T1 assigns x to y (y=x) and T2 assigns y to x (x=y), and initially x=1 ∧y=2. If T1 and T2 execute in a serializable fashion, the final state should be either x=2 ∧y=2 (T1 executes after T2 finishes), or x=1 ∧y=1 (T2 executes after T1). However in snapshot isolation, Both T1 and T2 take snapshots that capture the initial state x=1 ∧y=2, T1 modifies y to be 1 and commits, and T2 modifies x to be 2 and commits. The final state becomes x=2 ∧y=1.

In this example no matter whether x and y are on the same DN or two different DNs, the initial state x=1 ∧y=2 can be visible to both T1 and T2. Since T1 modifies x and T2 modifies y, there are no write-write conflicts. T1 and T2 both commit and lead to final state x=2 ∧y=1.

Various known error conditions will now be described, as well as how embodiments of the present disclosure handle or prevent them.

A dirty write (P0) occurs when transaction 1 writes [x], then transaction 2 writes [x], then transaction 1 commits or aborts, and transaction 2 commits or aborts, in any order (w1 [x], w2[x], ((c1 or a1) and (c2 or a2)).

Embodiments of the disclosure prevent P0 because T1 is invisible to T2 and T2 is invisible to T1. They both update x, and on commit, one of them aborts.

A dirty read strict (A1) occurs when transaction 1 writes [x], then transaction 2 reads [x], then transaction 1 aborts and transaction 2 commits, in any order (w1 [x], r2[x], (a1 and c2 in either order).

Embodiments of the disclosure prevent A1 because T1 is not committed and is invisible to T2 when r2[x] happens. T1 is invisible to T2 throughout T2's lifetime.

A dirty read (P1) occurs when transaction 1 writes [x], then transaction 2 reads [x], then transaction 1 commits or aborts, and transaction 2 commits or aborts, in any order (w1 [x], r2[x], ((c1 or a1) and (c2 or a2) in any order).

Embodiments of the disclosure prevent P1 because T1 is not committed and is invisible to T2 when r2[x] happens. T1 is invisible to T2 throughout T2's lifetime.

A non-repeatable read strict (A2) occurs when transaction 1 reads [x], then transaction 2 writes [x], then transaction 2 commits, then transaction 1 reads [x] again, then transaction 1 commits (r1[x], w2[x], c2, r1[x], c1.

Embodiments of the disclosure prevent A2 because T2 is invisible to T1 throughout T1's life time.

A non-repeatable read (P2) occurs when transaction 1 reads [x], then transaction 2 writes [x], then transaction 1 commits or aborts and transaction 2 commits or aborts in any order (r1 [x], w2[x], ((c1 or a1) and (c2 or a2) any order).

Embodiments of the disclosure prevent P2 because T2 is invisible to T1 throughout T1's lifetime A phantom strict (A3) occurs when transaction 1 reads a set of records P, then transaction 2 writes [y], which is in P, then transaction 2 commits, then transaction 1 reads P again, then commits (r1 [P], w2[y in P], c2, r1 [P], c1.

Embodiments of the disclosure prevent A3 because T2 is invisible to T1 throughout T1's lifetime A phantom (P3) occurs when transaction 1 reads a set of records P, then transaction 2 writes [y], which is in P, then transaction 1 commits or aborts, and transaction 2 commits or aborts, in any order (r1 [P], w2[y in P], ((c1 or a1) and (c2 or a2) any order).

Embodiments of the disclosure prevent P3 because T2 is invisible to T1 throughout T1's lifetime.

A lost update (P4) occurs when transaction 1 reads [x], then transaction 2 writes [x], then transaction 1 writes [x], then transaction 1 commits (r1[x], w2[x], w1 [x], c1.

Embodiments of the disclosure prevent P4 because T1 and T2 are invisible to each other and they both update x, and one of them aborts.

Read skew (A5A) occurs when transaction 1 reads [x], then transaction 2 writes [x], then transaction 2 writes [y], then transaction 2 commits, then transaction 1 reads [y], then transaction 1 commits or aborts (r1 [x], w2[x], w2[y], c2, r1 [y], (c1 or a1).

Embodiments of the disclosure prevent A5A because T2 is invisible to T1 throughout T1's lifetime.

Write skew (A5B) occurs when transaction 1 reads [x], then transaction 2 reads [y], then transaction 2 writes [y], then transaction 2 writes [x], then transactions 1 and 2 commit (r1 [x], r2[y], w1 [y], w2[x], (c1 and c2 occur).

Embodiments of the disclosure may exhibit A5B because T1 and T2 writes to disjoint sets of data {x} and {y}, and they can both commit. Embodiments of the disclosure may also display an additional anomaly when single-shard and multi-shard transactions are mixed in execution.

Single-shard transactions T1 and T2 are from the same client session, and therefore they have serializable execution. On DN1, T1 modifies a from 0 to 1 and commits, then on DN2, T2 modifies b from 0 to 1 and commits. Multi-shard transaction T3 reads a and b. T3 arrives at DN1 before T1 started, and T3 arrives at DN2 after T2 commits. Thus T3 doesn't see T1 (a is still 0), but sees T2 (b is 1), although T1 commits before T2 starts. This problem can also happen in read committed isolation level with the following history:

r3(a)w1(a)c1(a)w2(b)c2(b)r3(b)c3 given that read lock is released as soon as the read operation is done.

Single-shard transactions T1 and T2 are from the same client session, and therefore they have serializable execution. Multi-shard transaction T3 writes a (from 0 to 1) on DN1 and writes b (from 0 to 1) on DN2, and it is prepared in DN1 and committed in DN2. When T1 reads data b on DN2, it sees committed data after T3 (b=1), but the later transaction T2 does not see T3 commit (a=0). Therefore, for applications with multiple single-shard transaction, a serializable view is desired, they must be put into a single multi-shard transaction.

Figure 5:
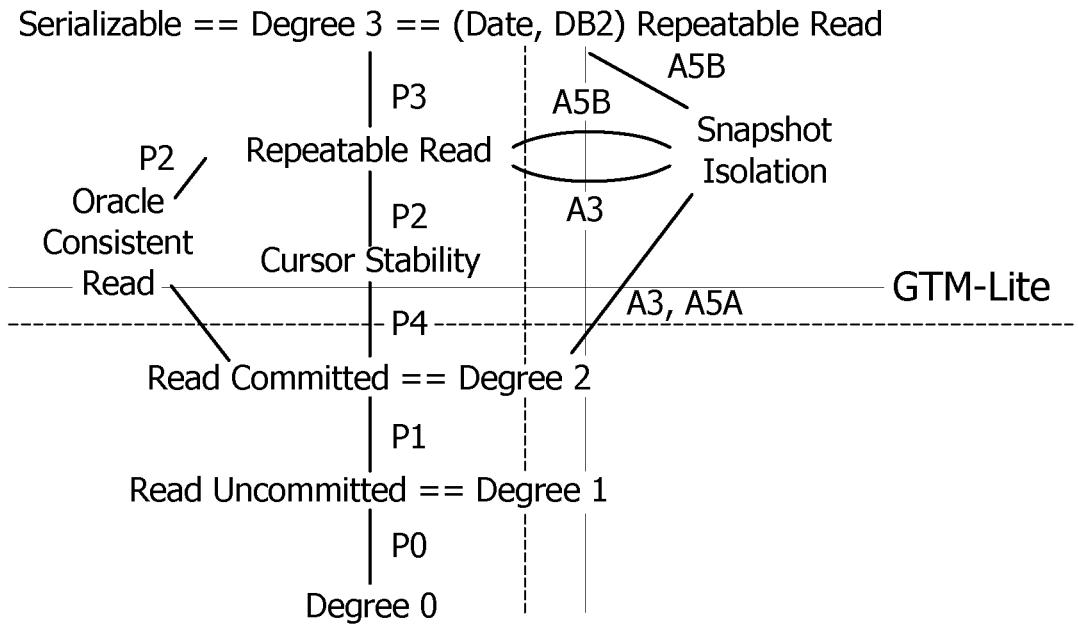
FIG. 5 illustrates various features of exemplary embodiments.

Embodiments of the present disclosure do not have dirty reads, non-repeatable reads and phantoms anomalies, but may demonstrate write skew and the additional anomaly described above. The isolation level maintained by embodiments of the disclosure as described herein are hence between read committed and snapshot isolation. FIG. 5 illustrates the strength of exemplary embodiments of the disclosure compared to other isolation levels.

Figure 6:
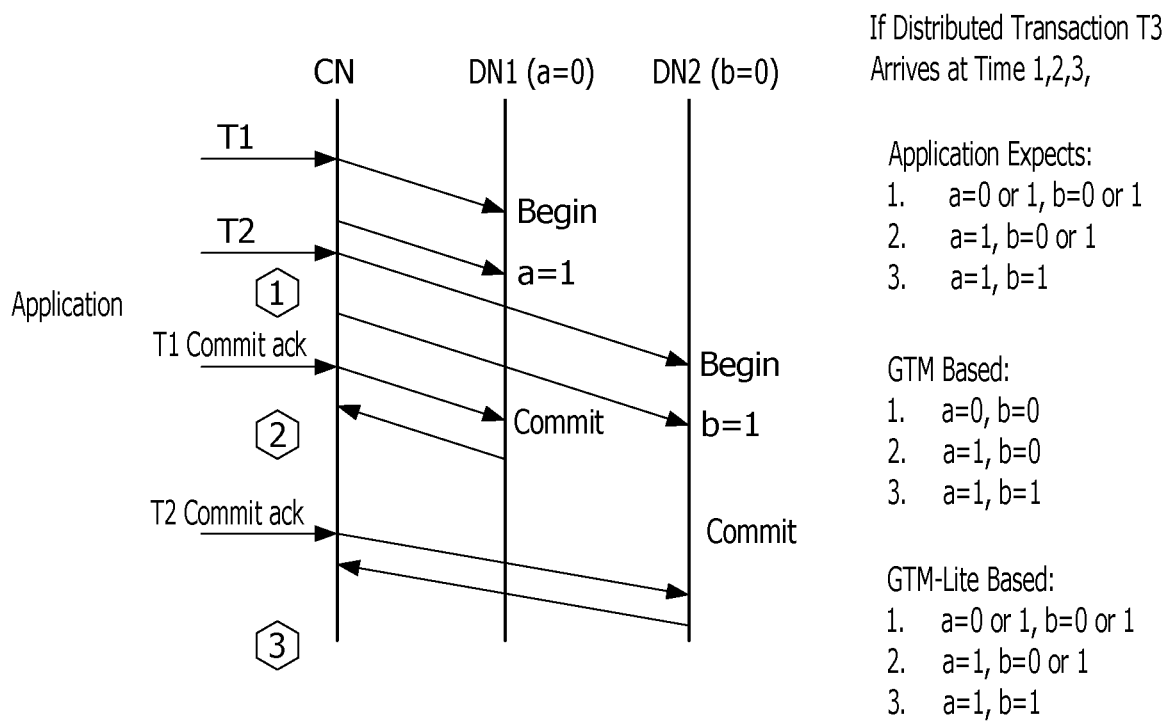
FIG. 6 illustrates communication flow for several transactions according to an exemplary embodiment.

One difference between exemplary embodiments of the present disclosure and conventional GTM relates to snapshot isolation (SI). According to exemplary embodiments, single-shard transactions are not managed by a GTM and do not acquire a distributed transaction ID (DXID). Instead, the local transaction TXID is maintained in a local snapshot for a visibility check. Among distributed transactions or among single-shard transaction, the visibility check proceeds the same way. Distributed transactions use the global transaction snapshot (including all active distributed transactions) and single-shard transactions use the local transaction snapshot. When a reader is a distributed transaction and the writers are single-shard transactions, SI according to embodiments of the disclosure may yield different results from GTM based SI. For example: record a=0 and b=0 are in DN1 and DN2 correspondingly. A single-shard transaction T1 updates a=1 and commits before another single-shard transaction T2 updates 1)=1. A distributed transaction T3 reads both a and b. FIG. 6 illustrates three possible times T3 can be issued by the application. At [1], T3 is issued after T1 and T2 are issued but while neither of them commits yet and before the application sends a commit command for T1 and T2. At [2], T3 is issued after T1 is committed and an ack is returned to the application. At [3], T3 is issued after T1 and T2 are both committed and both acks are returned to the application.

If T3 is issued at time [1], then the application considers T3 concurrently running with T1 and T2. The application would expect T3 to read all possible combination values of a and b {(a=0,b=0), (a=1,b=0), (a=0,b=1), (a=1,b=1)}. If the application sends a commit command for T1 or T2 but does not receive an ack, then the application should expect the same result. For conventional GTM based solutions, T3 would return a=0 and b=0; while according to embodiments of the disclosure, T3 will get {(a=0,b=0), (a=1,b=0), (a=0, b=1), (a=1,b=1)}, depending on when T3 is started in DN2.

If T3 is issued at time [2], then T1 is already committed and the application already gets the ack. The application should expect {(a=1, b=0), (a=1, b=1)}. For conventional GTM based solutions, T3 would return {(a=1,b=0)}; while with solutions based on embodiments of the disclosure, T3 will correctly return {(a=1,b=0), (a=1,b=1)}.

If T3 is issued at time [3], then T1 and T2 are already committed and the application has already received both acks, the application should expect {(a=1,b=1)}. For conventional GTM based solutions, T3 would return {(a=1,b=1)}; while for embodiments of the disclosure, T3 will also return {(a=1,b=1)}.

The above illustrates that, if snapshot isolation is used, the application should expect that the result of the currently-running transactions is not deterministic. SI based on embodiments of the disclosure advantageously correctly satisfy the expectation from the application view, in both concurrent execution and serialized execution.

As mentioned in previously, when one distributed transaction has read-after-write dependence (or data confliction) on another distributed transaction in one DN, the reader transaction may pause, if the writer transaction already completes the prepare stage in this DN. Even though such pauses do not affect non-distributed transactions, they may introduce major slow-down to distributed transactions. The following session description explains the main factors that affect the delay caused by such read-after-write delay.

The following table provides symbols and their definition:

| symbol | definition |
| --- | --- |
| T | Time window: transactions arriving in this window may have chances to conflict (read-after-write dependency) |
| R | Transactions arrive at a rate of r |
| β | The ratio of distributed transactions to all transactions |
| λ | The delay between prepare and commit/abort of a distributed transaction |
| Q | the ratio of read-after-write dependence among transactions arriving during t in one DN |
| N | Number of total DNs |
| x | Number of DNs involved in a distributed transaction |

For simplification, the following conditions are assumed:
(1) Only transactions arriving during T time window have a chance to conflict (read-after-write dependency)
(2) The confliction (read-after-write) possibility is not related to the execution time of transactions
(3) All distributed transactions involve x DNs (we can extend this by modeling the number of DNs in a distributed transact as a function, such as Zipf function)
(4) The average delay caused by read-after-write pause is $\lambda/2$
(5) Workload is evenly distributed to all DNs
Under these conditions, the average read-after-write delay is given by:

$$((xRT\beta/N)*Q*(\lambda/2))/RT\beta = (x*Q*\lambda)/2N$$

Based on the above modeling, the average read-after-write delay is associated with the number of DNs in distributed transactions, the number of total DNs, the ratio of confliction among concurrent distributed transaction in one DN, and the length of the delay between prepare and commit. If one distributed transaction needs to run in more DNs and the total DN number drops, then more concurrent distributed transactions occur in a DN, which increases confliction and its associated delay. The main factor is Q, the ratio of confliction among the concurrent distributed transactions in one DN. This factor is affected by how data is distributed and how applications access the data, and the scheduling of concurrent distributed transactions in one DN. The former depends on applications and their data. The latter can be optimized so that conflicted distributed transactions are run separately and reduce potential confliction as well as Q. Such optimization can include two fold operations: 1) schedule distribution transactions using different DNs to run together; 2) schedule distributed transactions without data dependency to run concurrently.

Some existing solutions appear to emphasize consistency when there are multiple databases involved in a distributed transaction, in which all participants either commit or do not commit, typically via two phase commit. In existing commercial literature, it is more difficult to find information regarding achieving a consistent view across the distributed database elements in light of the fact that they are committing at different times independently. Much of the documentation around two phase commit largely assumes one is interacting in a heterogeneous environment where the other transaction participants may be from other vendors entirely. If it is a homogeneous environment where all involved databases are from the same code and binaries, it is possible to take additional measures to ensure consistency in the face of concurrency.

Oracle makes use of a System Change Number (SCN) as a basis for achieving a consistent view of the data, even in a single Oracle database, the non-distributed case. The SCN acts as a timestamp such that during a database operation, it will have the same consistent view of the data, independent of other executing transactions. That is, it can see all data committed as of a certain SCN, and does not see any data committed after.

In the distributed case where all participants are Oracle databases, the process managing coordination of all of the nodes will collect the SCNs from all participants, choose the highest one, and use the same SCN on all nodes. While using the same SCN helps associate these together, the documentation mentions to ensure that the machines are synchronized to first execute a dummy query like "SELECT*FROM DUAL@REMOTE", but that is not sufficient if even more additional concurrent transaction executes in between the dummy query and the intended query.

Microsoft SQL Server and SAP Adaptive Server similarly use a commit timestamp mechanism internally for a single instance, but the documentation only mentions consistency for 2PC in terms of committing or not committing, and does not address concurrency.

For other RDBMS vendors, it is also difficult to find information regarding addressing this problem. The NoSQL databases typically only provide for single operations in a "transaction" and may allow for reading stale data. NewSQL vendors like Clustrix and MemSQL do not appear to have very much information in their documentation for how they handle concurrency.

Instead of a commit timestamp for a consistent view of the data, PostgreSQL makes use of snapshots, which consist of a list of running transaction ids, including a minimum and a maximum, known as xmin and xmax. Any data encountered that was written by transactions preceding xmin are known to be viewable, any following xmax are not viewable, and otherwise if the transaction is in the snapshot's list, it is not viewable. For Postgres-XC, Postgres-XL, and Gauss MPPDB, this is extended cluster-wide via a Global Transaction Manager (GTM), to make transaction identifiers and snapshots global.

Google Spanner makes use of a commit-wait mechanism before data becomes visible to overcome any uncertainty in time between the nodes. Concurrent read-only transactions get a consistent, but possibly slightly stale view of the data.

For exemplary embodiments of the present disclosure, distributed transaction identifiers are used only when necessary, and local snapshots are amended only as needed. In addition, a commit confirmation is done to avoid consistency anomalies. All tracking of distributed transaction identifiers (DXID) are centralized in the GTM. All distributed snapshots are obtained from the GTM. Transactions are removed from the GTM before sending a commit message to the involved nodes. When performing visibility checking of tuples on the nodes, if a tuple is in the prepared state, the system will wait until the corresponding local transaction has been locally committed and globally confirmed committed. The new approach results in a fresher view of the database for concurrent transactions.

The synchronization of distribution transactions in a sharded OLTP system is often achieved by a centralized global transaction manager (GTM), which provides a global consistent view or snapshot. However, the centralized GTM can become a major bottleneck in the system because every transaction needs to communicate with the GTM at beginning and commit time. Also, this complicated mechanism lengthens the latency of short single-shard transactions.

Embodiments of the present disclosure may be implemented as one or more nodes in a networked computing environment. Each node includes one or more processors capable of executing instructions or commands, a communications interface for communicating between nodes, and a set of instructions containing programming code (software) for the one or more processor to execute, stored on a computer-readable non-transitory media. The computer-readable non-transitory media includes all types of computer readable media, including magnetic storage media, optical storage media, flash media and solid state storage media.

Figure 7:
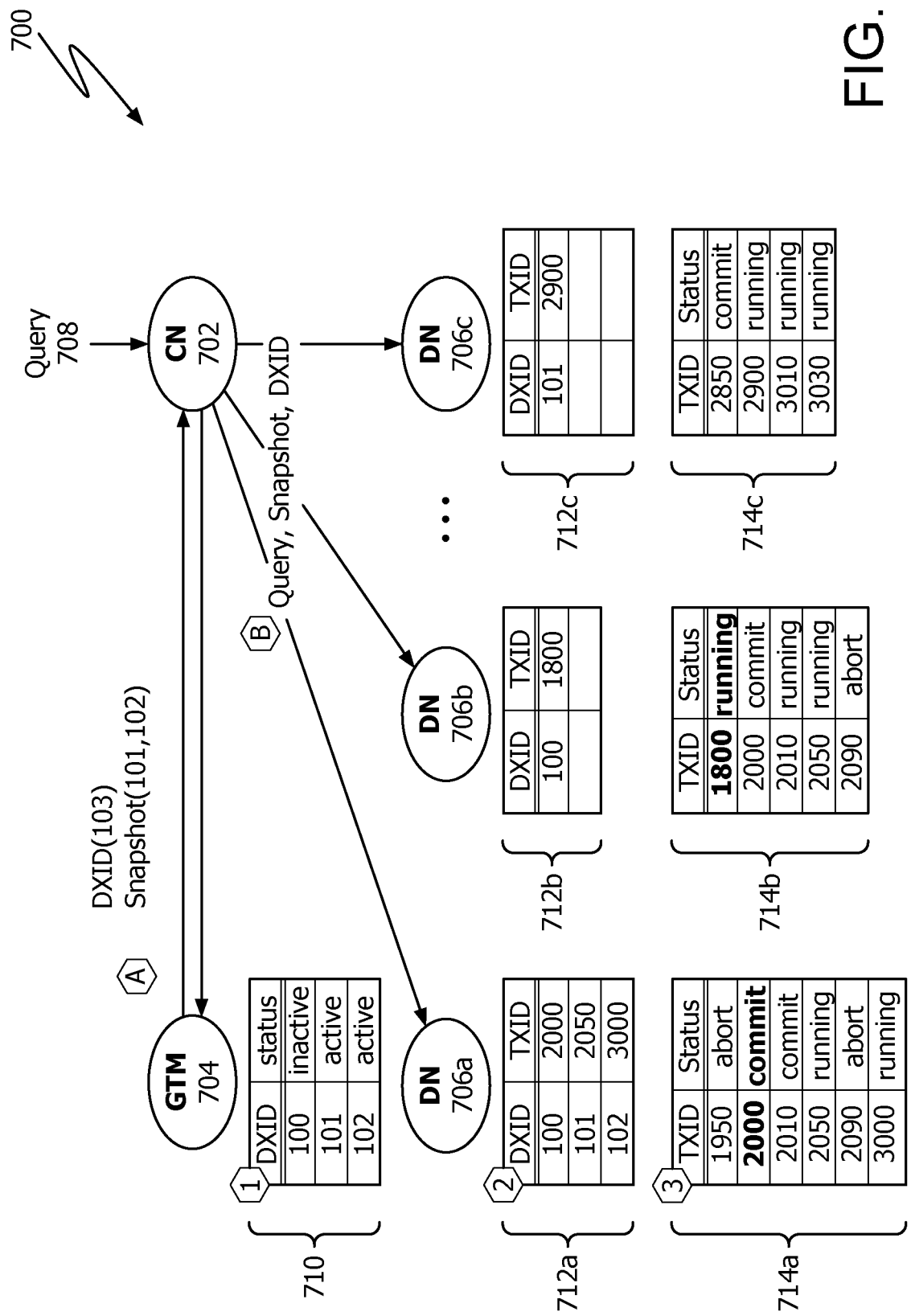
FIG. 7 illustrates a process of global and local snapshot maintenance according to an exemplary embodiment.

FIG. 7 illustrates a method of maintaining global and local snapshots according to exemplary embodiments of the disclosure. A system 700 includes a CN 702, a GTM 704 and a set of DN's 706a-706c. As illustrated, a multi-shard transaction query 708 is received at the CN 702, and the CN determines that the transaction is a multi-shard transaction. The CN then requests a DXID from the GTM 704. The GTM assigns a DXID (103) to the multi-shard transaction and records the transaction in a global distributed snapshot table 710. The global distributed snapshot table stores and updates the status of each active distributed transaction. The GTM sends the DXID (103) and the global snapshot back to the CN 702, which forwards the query, snapshot and DXID to two or more of the DNs 706a-706c. Each DN maintains two tables, a local distributed snapshot 712a-712c records a mapping between DXID's and local TXID's, and a local transaction table 714a-714c, which records the status of all local transactions, whether distributed or single-shard. At commit, the CN 702 first commits to the GTM 704, and the GTM 704 updates the global distributed snapshot 710. Next, the CN 702 instructs the DNs 706a-706c to commit. The DNs 706a-706c then update their local snapshots 714a-714c and local distributed snapshots 712a-712c.

Visibility checking according to exemplary embodiments of the disclosure will now be described. For single shard transactions, DXID's are not obtained, so the local snapshot of each DN is used to check the visibility of data. For multi-shard transactions, data is visible or invisible based on the state of the local and global snapshots. FIGS. 8A-8E illustrate the timing of transactions between a CN and DN for a transaction which is committed at access time. If data is from a multi-shard transaction (MS-Tx). In FIGS. 8A-8E, the following symbols should be understood to have the following meanings:

w: write MS-Tx
r: read MS-Tx
c_w: commit write MS-Tx in the CN/GTM
p_w: prepare write MS-Tx in the CN/GTM
a/c_w: abort or commit write MS-Tx in CN
p: prepared in DN
b: begin transaction c: commit in DN
a: access data As illustrated in FIG. 8A, data is invisible if the write MS-Tx's TXID is in the local snapshot and its DXID is in the global snapshot. As illustrated in FIG. 8B, data is invisible if the write MS-Tx's DXID is in the global snapshot but its TXID is not in the local snapshot, because the read arrives at the DN before the write). As illustrated in FIG. 8C, data is invisible if the write MS-Tx's DXID is not in the global snapshot but its TXID is in the local snapshot. Here the read arrives at the DN after the write, but the read starts at the GTM earlier than the write (the read's global snapshot maximum DXID is less than the write's DXID. The data is visible, however, if the write MS-Tx's DXID is not in the global snapshot but its TXID is in the local snapshot. Here the read arrives at the DN after the write, and the write was committed to the GTM before the read started. As illustrated in FIG. 8D, data is invisible if the write MS-Tx's DXID is not in either the global snapshot or the local snapshot, and the read starts at the GTM earlier than the write (the read's global snapshot maximum DXID is less than the write DXID). As illustrated in FIG. 8E, the data is visible if the write MS-Tx is not in either the global snapshot or the local snapshot. The read starts at the GTM after the write (the read's global snapshot minimum DXID is greater than the write's DXID).

FIGS. 8F-8K further illustrate the process of checking visibility of data if the data is from a multi-shard transaction which is in the prepare stage at access time. As illustrated in FIGS. 8F and 8G, data is invisible if the write MS-Tx is in both snapshots. As illustrated in FIG. 8H, data is invisible if the write MS-Tx DXID is in the global snapshot but its TXID is not in the local snapshot. As illustrated in FIG. 8I, data is invisible if the write MS-Tx DXID is not in the global snapshot, but its TXID is in the local snapshot. The read reaches the GTM before the write (the read's global snapshot maximum DXID or the DXID of the read is less than the write DXID. As illustrated in FIG. 8J, the data is visible on commit or invisible on abort, if the write MS-Tx's DXID is not in the global snapshot but its TXID is in the local snapshot. The write commits or aborts at the GTM but not at the DN. The read starts after the write, so the system must wait until the write MS-Tx commits or aborts in the DN. As illustrated in FIG. 8K, the data is invisible, if the write MS-Tx is not in either the global snapshot or the local snapshot, and the read starts before the write, that is, the read DXID is less than the write DXID.

FIG. 9 is a flowchart illustrated an exemplary embodiment of the invention. The method 900 begins with the CN receiving a transaction query at step 902. Next, the CN determines if the transaction is a single shard transaction or a multi-shard transaction at step 904. When the transaction is a multi-shard transaction the method proceeds to step 906, and the CN requests a DXID from the GTM. The CN receives the assigned DXID at step 908. Finally, the CN sends the query and the DXID to the two or more data nodes associated with the transaction at step 910. When, however, the transaction is determined to be a single shard transaction at step 904, the method proceeds directly to step 912, and the CN send the query directly to the data node associate with the transaction, without first communicating with the GTM. In either case, the method next returns to step 902, so the CN can receive and process the next transaction.

FIG. 10 is a schematic diagram of a network device 1000, such as a coordinator node (CN) according to an embodiment of the disclosure. The network device 1000 is suitable for implementing the disclosed embodiments as described herein. The network device 1000 ingress ports 1009 and receiver units (Rx) 1008 for receiving data; a processor, logic unit, or central processing unit (CPU) 1002 to process data; transmitter units (Tx) 1006 and egress ports 1007 for transmitting data; and a memory 1004 for storing data. The network device 1000 may also comprise optical-to-electrical (OE) components and electrical-to-optical (EO) components (not shown) coupled to the ingress ports 1009, the receiver units 1008, the transmitter units 1006, and the egress ports 1007 for egress or ingress of optical or electrical signals.

The processor 1002 is implemented by hardware and software. The processor 1002 may be implemented as one or more CPU chips, cores (e.g., as a multi-core processor), field programmable gate arrays (FPGAs), application specific integrated circuits (ASICs), and digital signal processors (DSPs). The processor 1002 is in communication with the ingress ports 1009, receiver units 1008, transmitter units 1006, egress ports 1007, and memory 1004. The processor 1002 comprises a coding module 1016. The coding module 1016 implements the disclosed embodiments described herein. For instance, the coding module 1016 implements, processes, prepares, or provides the various coding operations. The inclusion of the coding module 1016 therefore provides a substantial improvement to the functionality of the detwork device and effects a transformation of the network device 1000 to a different state. Alternatively, the coding module 1016 is implemented as instructions stored in the memory 1004 and executed by the processor 1002.

The memory 1004 comprises one or more discs, tape drives, and solid-state drives and may be used as an overflow data storage device, to store programs when such programs are selected for execution, and to store instructions and data that are read during program execution. The memory 1004 may be volatile and/or non-volatile and may be read-only memory (ROM), random access memory (RAM, ternary content-addressable memory (TCAM), and/or statuc random-access memory (SRAM).

Transmitter 1006 and receiver 1008 send and receive signals through respective egress ports and ingress ports to any suitable communications network 1010. As illustrated, device 1000 may communicate with a GTM 1012 or a DN 1014 via the communications network 1010. Receiver 1008 receives query requests and transmitter 1006 sends queries to a DN 1014 or sends a DXID request to a GTM 1012 as described herein.

FIG. 11 is a schematic diagram of a network device 1100, such as a coordinator node (CN) according to an embodiment of the disclosure. The network device 1100 is suitable for implementing the disclosed embodiments as described herein. The network device 1100 ingress units 1109 and receiver units (Rx) 1108 for receiving data; a processing unit, logic unit, or central processing unit (CPU) 1102 to process data; transmitter units (Tx) 1106 and egress units 1107 for transmitting data; and a memory unit 1104 for storing data. The network device 1100 may also comprise optical-to-electrical (OE) components and electrical-to-optical (EO) components (not shown) coupled to the ingress units 1109, the receiver units 1108, the transmitter units 1106, and the egress units 1107 for egress or ingress of optical or electrical signals.

The processing unit 1102 is implemented by hardware and software. The processing unit 1102 may be implemented as one or more CPU chips, cores (e.g., as a multi-core processor), field programmable gate arrays (FPGAs), application specific integrated circuits (ASICs), and digital signal processors (DSPs). The processing unit 1102 is in communication with the ingress units 1109, receiver units 1108, transmitter units 1106, egress units 1107, and memory unit 1104. The processing unit 1102 comprises a coding module 1116. The coding module 1116 implements the disclosed embodiments described herein. For instance, the coding module 1116 implements, processes, prepares, or provides the various coding operations. The inclusion of the coding module 1116 therefore provides a substantial improvement to the functionality of the detwork device and effects a transformation of the network device 1100 to a different state. Alternatively, the coding module 1116 is implemented as instructions stored in the memory unit 1104 and executed by the processor 1102.

The memory unit 1104 comprises one or more discs, tape drives, and solid-state drives and may be used as an overflow data storage device, to store programs when such programs are selected for execution, and to store instructions and data that are read during program execution. The memory unit 1104 may be volatile and/or non-volatile and may be read-only memory (ROM), random access memory (RAM), ternary content-addressable memory (TCAM), and/or statue random-access memory (SRAM).

Transmitting unit 1106 and receiving unit 1108 send and receive signals through respective egress units 1107 and ingress units 1109 to any suitable communications network 1110. As illustrated, device 1100 may communicate with a GTM 1012 or a DN 1014 via the communications network 1110. Receiving unit 1108 receives query requests and transmitting unit 1006 sends queries to a DN 1014 or sends a DXID request to a GTM 1012 as described herein.

It should be understood that software can be installed in and sold with the one or more nodes described above. Alternatively, the software can be obtained and loaded into the one or more nodes, including obtaining the software through physical medium or a distribution system, such as, for example, from a server owned by the software creator or from a server not owned but used or authorized to be used by the software creator. The software can be stored on a server for distribution over the Internet, for example.

According to one aspect of the present disclosure, there is a provided a system for processing database transactions. The system comprises a coordinator node (CN) that receives a transaction query. The CN determines if the transaction is a single shard transaction or a multi-shard transaction. When the transaction is determined by the CN to be a multi-shard transaction, the CN requests a distributed transaction ID (DXID) for the transaction from a global transaction manager (GTM), receives the DXID for the transaction, and sends the query and the DXID to two or more data nodes associated with the transaction. When however, the transaction is determined to be a single shard transaction, the CN sends the query to a single data node associated with the transaction without first requesting a DXID from the GTM. This system advantageously reduced communications with the GTM, thereby reducing communication overhead and increasing the efficiency of transaction processing in a sharded database.

Optionally, in any of the preceding aspects the system further includes: when the transaction is determined by the CN to be a multi-shard transaction, the CN is configured to request a global snapshot from the GTM, and send the global snapshot to the two or more data nodes associated with the transaction.

Optionally, in any of the preceding aspects the transaction relates to an online transaction processing (OLTP) database. Also optionally, in any of the preceding aspects the CN maintains a global schema. Also optionally, in any of the preceding aspects of the system, the two or more data nodes receiving the global snapshot merge the global snapshot with a local snapshot. Also optionally, in any of the preceding aspects of the system, the data nodes maintain a list of active local transactions, and for a multishard transaction, each data node associated with the transaction maps the DXID to a local transaction ID (TXID). Also optionally, in any of the preceding aspects of the system, the data nodes read data modified by a multishard transaction, and determine that the data is visible if: the multishard transaction is committed and the multishard transaction is not in the global snapshot but is in the local snapshot, or the multishard transaction is committed and the DXID is not in the global snapshot or the local snapshot and a global snapshot minimum DXID is greater than the multishard transaction DXID, or the multishard transaction is in a prepare state and then commits and the multishard transaction is not in the global snapshot and is in the local snapshot. Also optionally, in any of the preceding aspects of the system, if the transaction is a single shard transaction, the CN commits the transaction after the data node executes the transaction, and the single data node commits the transaction without interacting with the GTM.

According to another aspect of the present disclosure, there is provided a method that includes receiving a transaction query at a coordinator node, and determining if the transaction is a single shard transaction or a multi-shard transaction. When the transaction is determined to be a multi-shard transaction, the steps provide for requesting a distributed transaction ID (DXID) for the transaction from a global transaction manager (GTM), receiving the DXID for the transaction, and sending the query and the DXID to two or more data nodes associated with the transaction. When, however, the transaction is determined to be a single shard transaction, the steps provide for sending the query to a single data node associated with the transaction without first requesting a DXID from the GTM.

Optionally, in any of the preceding aspects of the method, when the transaction is determined to be a multi-shard transaction, the method further comprises steps of requesting a global snapshot from the GTM, and sending the global snapshot to the two or more data nodes associated with the transaction.

Optionally, in any of the preceding aspects of the method, the transaction relates to an online transaction processing (OLTP) database. Also optionally, in any of the preceding aspects of the method, the CN maintains a global schema. Also optionally, in any of the preceding aspects of the method, the two or more data nodes receiving the global snapshot, merge the global snapshot with a local snapshot.

Optionally, in any of the preceding aspects the method further comprises maintaining, in a data node, a list of active local transactions, and for a multishard transaction, each data node associated with the transaction mapping the DXID to a local transaction ID (TXID).

Optionally, in any of the preceding aspects the method further comprises reading data modified by a multishard transaction, and determining that the data is visible if the multishard transaction is committed and the multishard transaction is not in the global snapshot but is in the local snapshot, or the multishard transaction is committed and the DXID is not in the global snapshot or the local snapshot and a global snapshot minimum DXID is greater than the multishard transaction DXID, or the multishard transaction is in a prepare state and then commits and the multishard transaction is not in the global snapshot and is in the local snapshot. Optionally, in any of the preceding aspects of the method if the transaction is a single shard transaction, after the data node executes the transaction, the CN committing the transaction, and the single data node committing the transaction without interacting with the GTM.

What is claimed is:

1. A system for processing database transactions, comprising:
a coordinator node (CN) that receives a query for a transaction and determines whether the transaction is a single shard transaction or a multi-shard transaction;
when the transaction is determined by the CN to be a multi-shard transaction:
the CN is configured to request a distributed transaction ID (DXID) and a global snapshot for the transaction query from a global transaction manager (GTM), receive the DXID for the transaction, and
send the query, the DXID, and the global snapshot to two or more data nodes associated with the transaction, wherein the multi-shard transaction is in a local snapshot and is not in the global snapshot; and
when the transaction is determined by the CN to be a single shard transaction:
the CN is configured to send the query to a single data node associated with the transaction without first requesting a DXID from the GTM.

2. The system of claim 1, wherein the transaction relates to an online transaction processing (OLTP) database.

3. The system of claim 1, wherein the CN maintains a global schema.

4. The system of claim 1, wherein the two or more data nodes receiving the global snapshot merge the global snapshot with the local snapshot.

5. The system of claim 1, wherein the data nodes maintain a list of active local transactions, and for a multi-shard transaction, each data node associated with the transaction maps the DXID to a local transaction ID (TXID).

6. The system of claim 5, wherein the two or more data nodes read data modified by a multi-shard transaction, and determine that the data is visible when:
the multi-shard transaction is committed and the DXID is not in the global snapshot or the local snapshot and a global snapshot minimum DXID is greater than the multi-shard transaction DXID, or
the multi-shard transaction is in a prepare state and then commits and the multi-shard transaction is not in the global snapshot and is in the local snapshot.

7. The system of claim 1, wherein if the transaction is a single shard transaction, the CN commits the transaction after the data node executes the transaction, and the single data node commits the transaction without interacting with the GTM.

8. A computer implemented method for processing database transactions, comprising the steps of:
receiving, at a coordinator node having one or more processors for executing instructions, a query for a transaction;
determining if the transaction is a single transaction or a multi-shard transaction;
when the transaction is determined to be a multi-shard transaction:
requesting a distributed transaction ID (DXID) for the transaction and a global snapshot from a global transaction manager (GTM) having one or more processors for executing instructions,
receiving the DXID for the transaction from the GTM at the coordinator node,
sending the query, the DXID, and the global snapshot to two or more data nodes associated with the transaction, wherein the multi-shard transaction is in a local snapshot and is not in the global snapshot; and
when the transaction is determined to be a single shard transaction:
sending the query to a single data node associated with the transaction without first requesting a DXID from the GTM.

9. The computer implemented method of claim 8, wherein the transaction relates to an online transaction processing (OLTP) database.

10. The computer implemented method of claim 8, wherein the CN maintains a global schema.

11. The computer implemented method of claim 8, wherein the two or more data nodes receiving the global snapshot, merge the global snapshot with the local snapshot.

12. The computer implemented method of claim 8, further comprising maintaining, in a data node, a list of active local transactions, and for a multi-shard transaction, each data node associated with the transaction mapping the DXID to a local transaction ID (TXID).

13. The computer implemented method of claim 12, further comprising reading data modified by a multi-shard transaction, and determining that the data is visible when:
the multi-shard transaction is committed and the multi-shard transaction is not in the global snapshot but is in the local snapshot, or
the multi-shard transaction is committed and the DXID is not in the global snapshot or the local snapshot and a global snapshot minimum DXID is greater than the multi-shard transaction DXID, or
the multi-shard transaction is in a prepare state and then commits and the multi-shard transaction is not in the global snapshot and is in the local snapshot.

14. The computer implemented method of claim 8, further comprising if the transaction is a single shard transaction, after the data node executes the transaction, the CN committing the transaction, and the single data node committing the transaction without interacting with the GTM.

15. A non-transitory computer-readable media storing computer instructions, that when executed by one or more processors, cause the one or more processors to perform the steps of:
receiving a query at a coordinator node;
determining if the transaction is a single shard transaction or a multi-shard transaction;
when the transaction is determined to be a multi-shard transaction:
requesting a distributed transaction ID (DXID) and a global snapshot for the transaction from a global transaction manager (GTM),
receiving the DXID for the transaction,
sending the query, the DXID, and the global transaction to two or more data nodes associated with the transaction, wherein the multi-shard transaction is in a local snapshot and is not in the global snapshot; and
when the transaction is determined to be a single shard transaction:
sending the query to a single data node associated with the transaction without first requesting a DXID from the GTM.

16. The non-transitory computer-readable medium of claim 15, wherein the transaction relates to an online transaction processing (OLTP) database.

17. The non-transitory computer-readable medium of claim 15, wherein the CN maintains a global schema.

18. The non-transitory computer-readable medium of claim 15, wherein the two or more data nodes receiving the global snapshot merge the global snapshot with the local snapshot.

19. The non-transitory computer-readable medium of claim 15, wherein the instructions cause the one or more processors to perform the further step of maintaining, in a data node, a list of active local transactions, and for a multi-shard transaction, each data node associated with the transaction mapping the DXID to a local transaction ID (TXID).

20. The computer implemented method of claim 19, wherein the instructions cause the one or more processors to perform the further steps of reading data modified by a multi-shard transaction, and determining that the data is visible when:

the multi-shard transaction is committed and the multi-shard transaction is not in the global snapshot but is in the local snapshot, or the multi-shard transaction is committed and the DXID is not in the global snapshot or the local snapshot and a global snapshot minimum DXID is greater than the multi shard multi-shard transaction DXID, or the multi-shard transaction is in a prepare state and then commits and the multi-shard transaction is not in the global snapshot and is in the local snapshot.

21. The computer implemented method of claim 15, wherein the instructions cause the one or more processors to perform the further step of, if the transaction is a single shard transaction, after the data node executes the transaction, the CN committing the transaction, and the single data node committing the transaction without interacting with the GTM.

* * * * *